(12) United States Patent
Appleby et al.

(10) Patent No.: US 8,270,404 B2
(45) Date of Patent: Sep. 18, 2012

(54) SYSTEM, METHOD, AND COMPUTER PROGRAM PRODUCT FOR IMPROVED DISTRIBUTION OF DATA

(75) Inventors: Richard Appleby, Warsash (GB); John Easton, Bradley (GB)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 12/030,449

(22) Filed: Feb. 13, 2008

(65) Prior Publication Data
US 2009/0201930 A1     Aug. 13, 2009

(51) Int. Cl.
*H04L 12/28* (2006.01)
*G06F 15/173* (2006.01)

(52) U.S. Cl. ......... 370/390; 370/351; 370/392; 709/226

(58) Field of Classification Search .......... 370/328–352, 370/389–392, 395–474; 709/3, 205–214, 709/226–231, 236–249; 712/28
See application file for complete search history.

(56) References Cited

U.S. PATENT DOCUMENTS

| | | | |
|---|---|---|---|
| 5,623,688 A * | 4/1997 | Ikeda et al. ................... 712/28 |
| 5,918,021 A * | 6/1999 | Aditya ............................ 709/235 |
| 5,983,024 A | 11/1999 | Fye | |
| 7,146,421 B2 * | 12/2006 | Syvanne ........................ 709/226 |
| 7,483,997 B2 * | 1/2009 | Yagiu ............................ 709/237 |
| 7,606,227 B2 * | 10/2009 | Fukushima et al. .......... 370/390 |
| 7,707,300 B1 * | 4/2010 | Champagne .................. 709/231 |
| 8,005,085 B2 * | 8/2011 | Bakker et al. ................. 370/390 |
| 2004/0103218 A1 * | 5/2004 | Blumrich et al. ............. 709/249 |
| 2006/0029139 A1 * | 2/2006 | Teichner et al. ......... 375/240.28 |
| 2006/0078120 A1 * | 4/2006 | Mahendran et al. .......... 380/255 |
| 2006/0252420 A1 * | 11/2006 | Mantravadi et al. .......... 455/423 |
| 2006/0265689 A1 * | 11/2006 | Kuznetsov et al. ........... 717/117 |
| 2006/0274720 A1 * | 12/2006 | Adams et al. ................. 370/351 |
| 2008/0002681 A1 * | 1/2008 | Bajic et al. ................... 370/389 |
| 2008/0002702 A1 * | 1/2008 | Bajic et al. ................... 370/392 |
| 2009/0059958 A1 * | 3/2009 | Nakata .......................... 370/474 |
| 2009/0106448 A1 * | 4/2009 | Yagiu ........................... 709/237 |

OTHER PUBLICATIONS

Michalis Faloutsos et al., "Multicast Routing with Heterogeneous Quality".
Dr. Ralf-Peter Mundani, "Parallel Programming and High-Performance Computing" Center for Simulation Technology in Engineering, Technische Universitat Muchen, pp. 5-1-5-88.

* cited by examiner

*Primary Examiner* — Man Phan
(74) *Attorney, Agent, or Firm* — Cantor Colburn LLP; Douglas Lashmit

(57) ABSTRACT

A method for improved distribution of data in a computing environment includes receiving data for distribution in the computing environment, receiving configuration data of the computing environment, parsing the data for distribution using the configuration data, and outputting header information of a packet, the packet including the data for distribution.

9 Claims, 6 Drawing Sheets

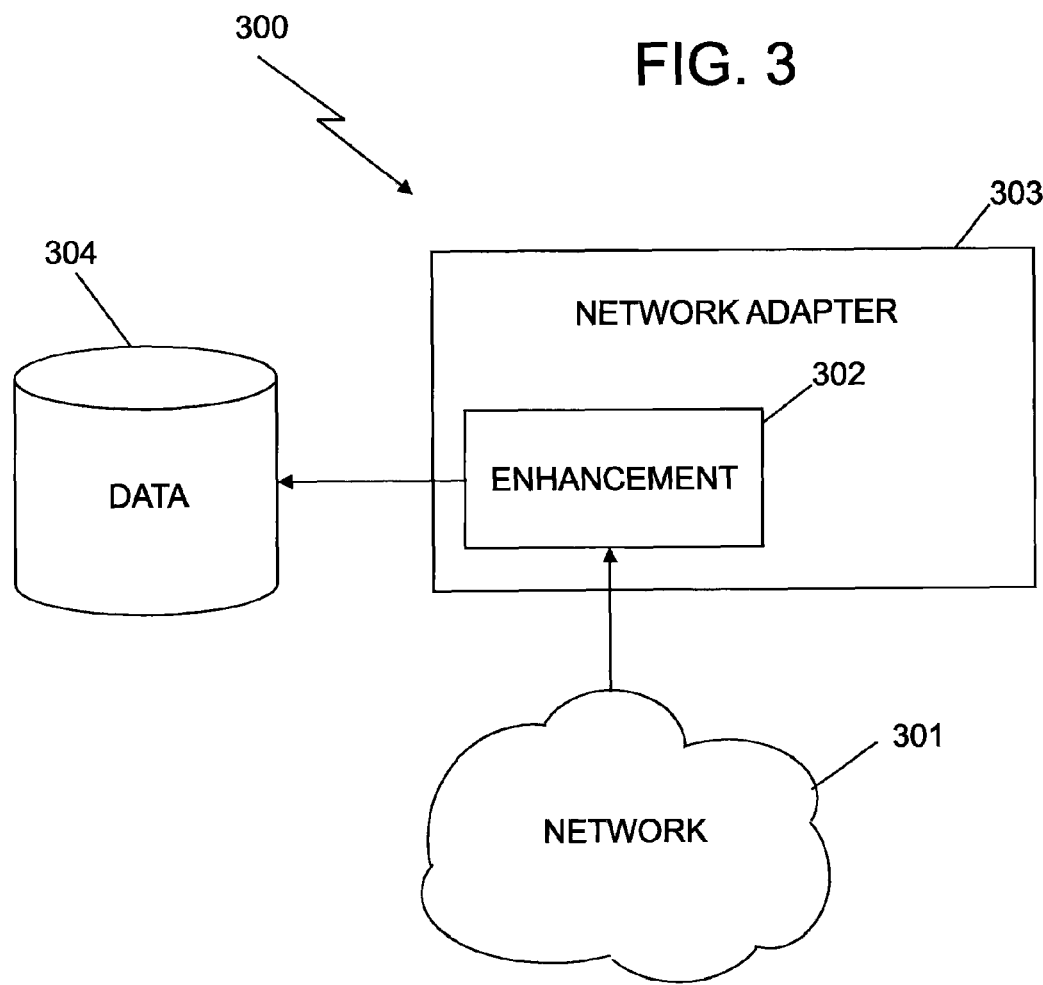
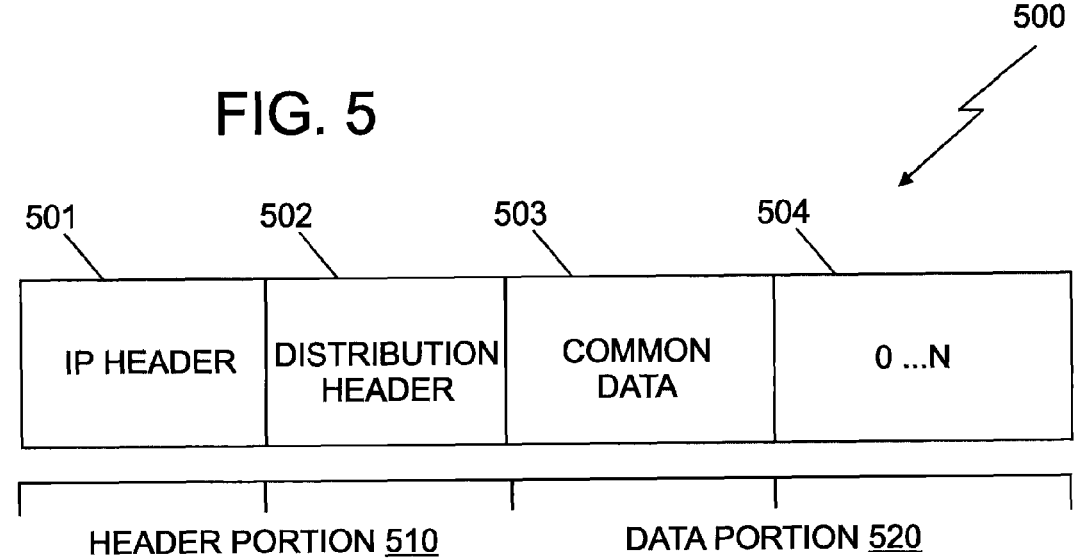

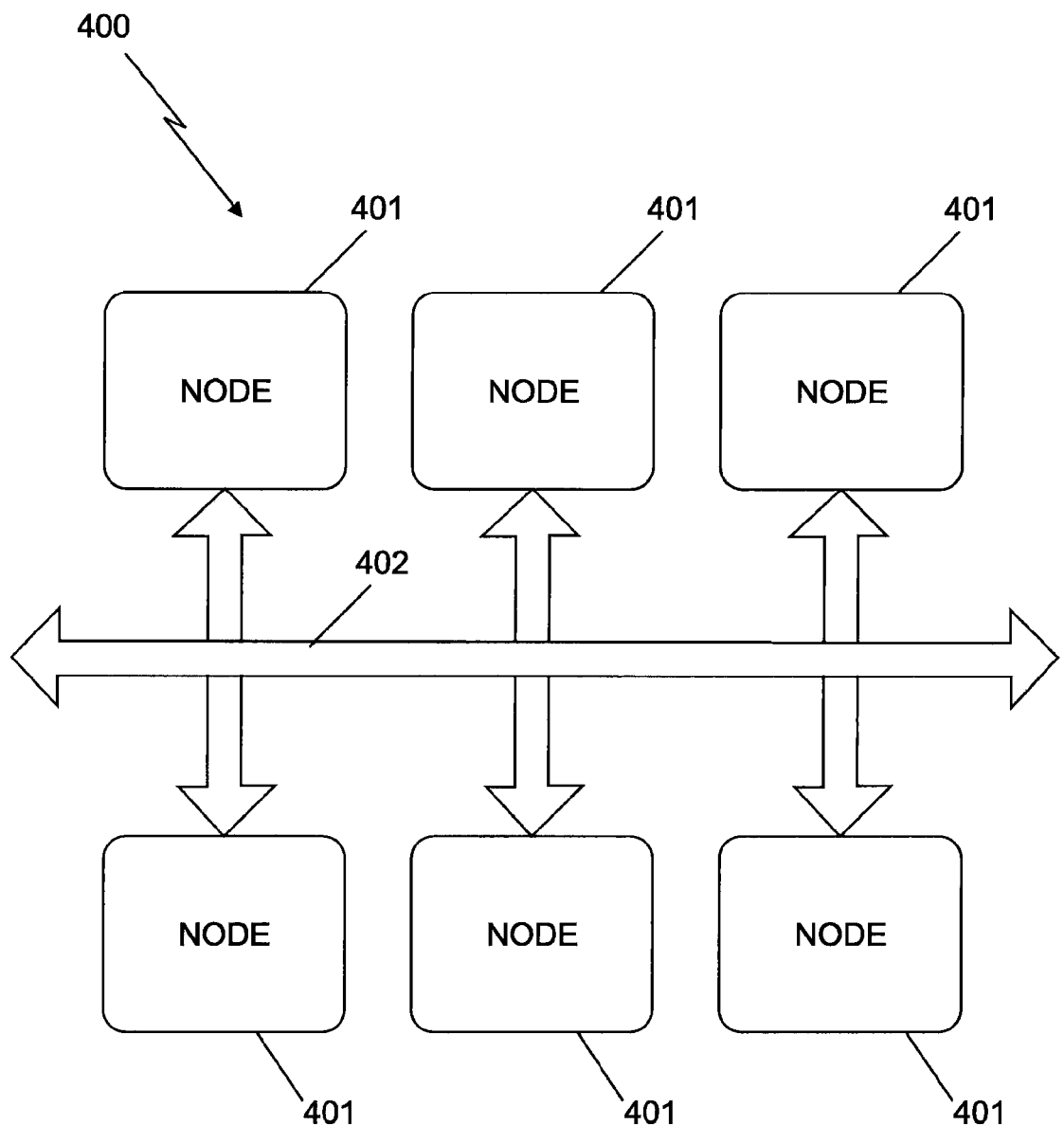

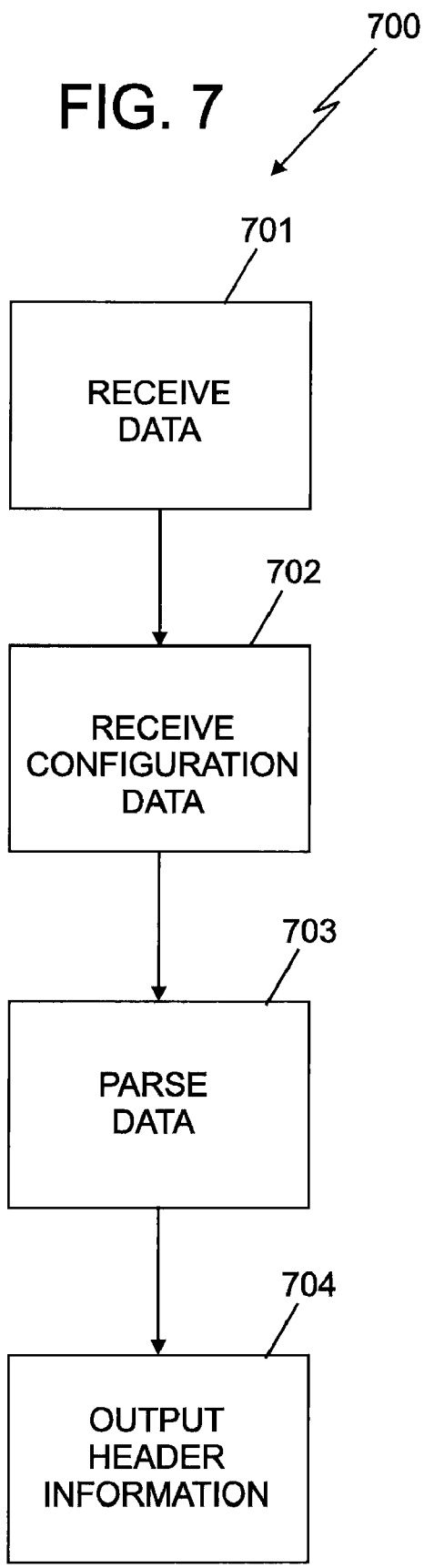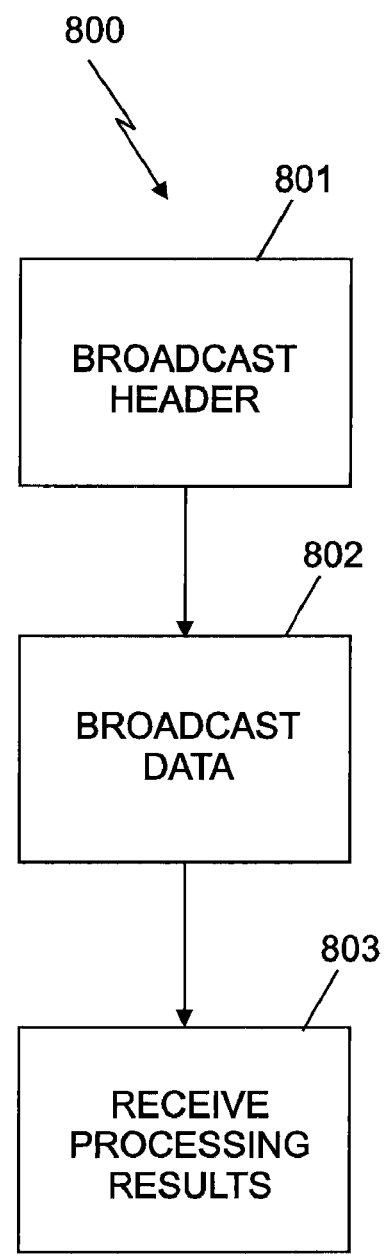

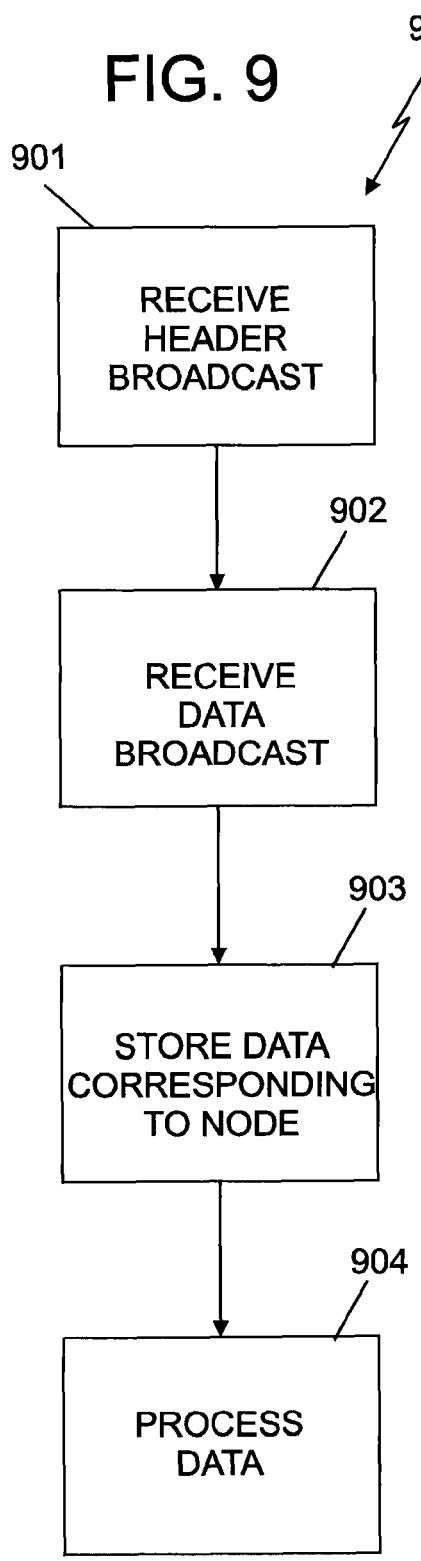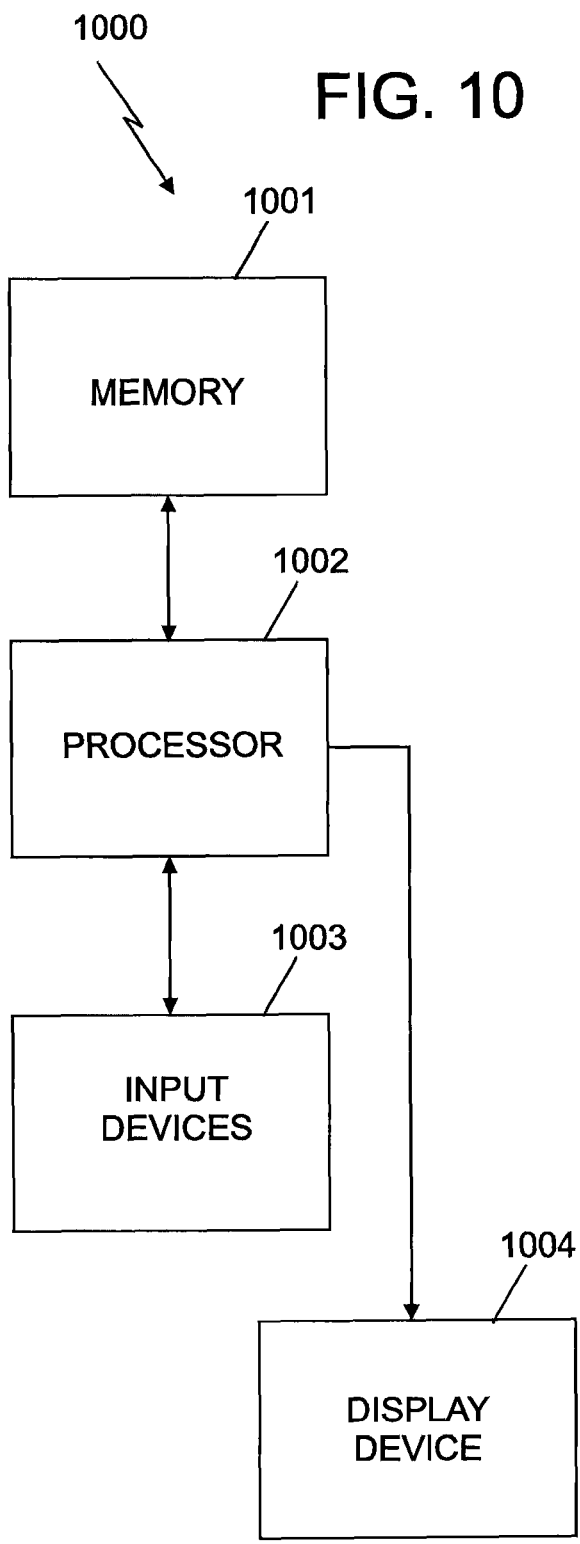

SYSTEM, METHOD, AND COMPUTER PROGRAM PRODUCT FOR IMPROVED DISTRIBUTION OF DATA

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

This invention generally relates to distribution of data. More particularly, this invention relates to a system, method, and computer program product for improved distribution of data in a computing environment.

2. Description of Background

In general computing systems, including computing systems with multiple nodes, relatively increased performance may be obtained through parallel processing. For example, a data set may be divided into smaller subsets by a head node. The head node may distribute the smaller subsets, individually, to a plurality of processing nodes. The processing nodes may return results to a further node, which may reassemble the smaller subset results into a complete result dataset, which may be a final result of this general parallel processing example. However, as is apparent, the head node and further node may form bottlenecks hindering the overall efficiency of the processing through use of system resources for subset division, subset distribution to corresponding nodes, and result assembly. If either the head node or further node is omitted, the process may be further hindered by use of system resources for storage of the complete data set in each of the plurality of processing nodes.

SUMMARY

An example embodiment of the present invention includes a method of improved distribution of data in a computer environment. The method includes receiving data for distribution in the computing environment, receiving configuration data of the computing environment, parsing the data for distribution using the configuration data, and outputting header information of a packet, the packet including the data for distribution.

An additional example embodiment of the present invention includes a method of improved distribution of data in a computing environment. The method includes receiving, at a node of the computing environment, a header information broadcast, receiving, at the node of the computing environment, a data broadcast, storing portions of the data broadcast corresponding to the node of the computing environment based on information interpreted from the header information broadcast, and processing the stored portions of data at the node of the computing environment.

An additional example embodiment of the present invention includes a computing system. The computing system includes a plurality of nodes in operative communication with each other, and a storage device including configuration information of the plurality of nodes. According to the example embodiment, each node of the plurality of nodes is configured to receive a header information broadcast and a data broadcast, each node of the plurality of nodes is configured to interpret the header information and direct portions of the data broadcast to be stored in respective nodes.

A further example embodiment of the present invention includes a computer program product including a computer readable medium with program segments for, when executed on a computer device, causing the computer device to implement a method of improved distribution of data. The method includes receiving data for distribution in the computing environment, receiving configuration data of the computing environment, parsing the data for distribution using the configuration data, and outputting header information of a packet, the packet including the data for distribution.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates a portion of a computing environment, according to an exemplary embodiment;

FIG. 4 illustrates a computing environment, according to an exemplary embodiment;

FIG. 5 illustrates a data packet, according to an exemplary embodiment;

FIG. 7 illustrates a flowchart for a method of forming packets, according to an exemplary embodiment;

FIG. 8 illustrates a flowchart for a method of distributing data, according to an exemplary embodiment;

FIG. 9 illustrates a flowchart of a method of distributing data, according to an exemplary embodiment; and FIG. 10 illustrates a computer apparatus, according to an exemplary embodiment.

The detailed description explains an exemplary embodiment, together with advantages and features, by way of example with reference to the drawings.

DETAILED DESCRIPTION

According to an exemplary embodiment, a method is provided which significantly increases the efficiency of data distribution in computing environments. This increase in efficiency results in a decrease in utilized network bandwidth, frees systems resources, and provides additional technical benefits as described herein.

If a large data set is used in computational tasks in a computing environment, moving the data set through multiple nodes for computation may consume large amounts of network and/or system resources. For example, several terabytes of data may be used in some banking applications, while clash analysis and pricing of equities may also utilize relatively large data sets. Many other applications may involve large data sets, and as such, example embodiments should not be limited to any particular application, but rather to any suitable application.

Some approaches to data distribution for parallel processing may include transmitting an entire data set to each of a plurality of processing nodes, or splitting the data set before distribution to each of the processing nodes. These approaches, although providing a manner by which to distribute data, may hinder overall efficiency through over utilization of system resources and network bandwidth. It follows that the technical effect of example embodiments is to provide a method of data distribution which increases the efficiency of data distribution in computing environments. The computing environments may include super-computing environments, clustered computing environments, grid computing environments, and any other suitable computing environment. Further, according to at least one example embodiment, distribution of data may be facilitated through the use of a header portion transmitted with a data set or portion of a data set to every node of a plurality of nodes in a computing environment. For example, a broadcasting approach may be used where a header portion is transmitted with information related to corresponding portions of a data set, including information related to directing particular portions of the data set to one or more nodes.

Figure 1:
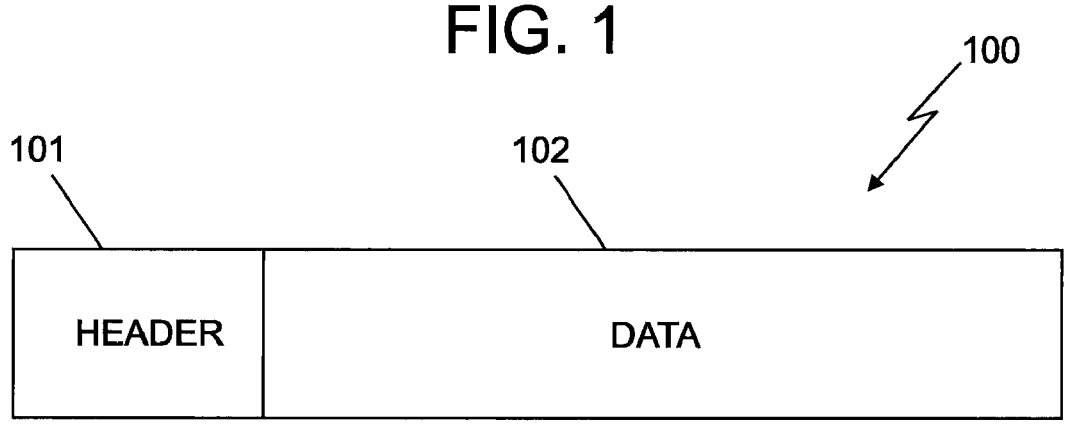
FIG. 1 illustrates a data packet, according to an exemplary embodiment.

Turning to FIG. 1, a data packet is illustrated, according to an example embodiment. The data packet 100 may include a header portion 101 and a data portion 102. The header portion 101 may include information related to distribution of data contained within the data portion 102. Furthermore, the data portion 102 may include at least a portion of information to be computed, processed, executed, and/or manipulated by one or more nodes in a computing environment. As illustrated, the header portion 101 is attached to the data portion 102. Therefore, the entire data packet 100 may be broadcast to all nodes of a computing environment, with the header portion 101 being received within relatively the same time as the data portion 102. However, example embodiments are not so limited.

Figure 2:
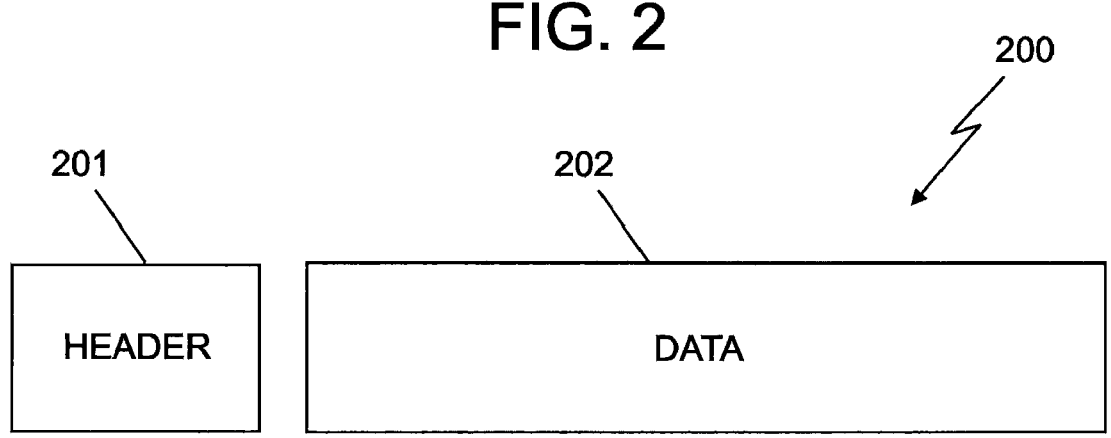
FIG. 2 illustrates a data packet, according to an exemplary embodiment.

For example, as illustrated in FIG. 2, a data packet 200 may include a header portion 201 and a data portion 202 which are not directly attached to one another. Therefore, either the header portion 201 or the data portion 202 may be transmitted simultaneously, in succession, or at different times altogether. For example, according to at least one example embodiment the header portion 201 is broadcast before the data portion 202. As described above, data packets (e.g., 100 and/or 200) may be broadcast to nodes of a computing environment. A portion of a computing environment is described more fully below with reference to FIG. 3.

FIG. 3 illustrates a portion of a computing environment, according to an exemplary embodiment. The portion 300 may include a network adapter 303 and a data storage portion 304. The network adapter 303 may include an enhancement portion 302 which may facilitate data distribution as is further described herein. The network adapter 303 may be operatively connected to a network 301. The network 301 may be any suitable network, and may transmit information (e.g., data packets) to the network adapter 303 and/or the enhancement portion 302. The data may include any relevant data to be processed by the entire computing environment to which portion 300 is a part of.

Upon receipt of the data packets, the enhancement portion 302 may interpret information included within the header portion of the data packets to decipher instructions, offsets, or other relevant information included therein. For example, the header portion may include offset values of data contained within a data portion of its respective packet. The offset values may direct the enhancement portion to store data within said offsets to the storage portion 304. In this manner, only portions of the data portion relevant to the portion 300 may be stored within the storage portion 304, and portions of the data portion not relevant to the portion 300 may be discarded thereby reducing use of system resources. Alternatively, if a header portion does not include instructions or data offset information, or even if a header portion is not received, the network adapter 303 may direct the entire data portion to be stored in the data portion 304. Therefore, exemplary embodiment allow for utilization of portions of a computing environment in virtually any manner. To better understand data distribution relative to an entire computing environment, the following description with reference to FIG. 4 is provided.

FIG. 4 illustrates a computing environment, according to an exemplary embodiment. The computing environment 400 may include a plurality of nodes 401. The plurality of nodes 401 may be somewhat similar to portion 300 described in FIG. 3; therefore, exhaustive description of the functionality of the nodes will be omitted herein for the sake of brevity. The computing environment 400 further includes communications channel 402. Communications channel 402 may be any suitable communications channel providing distribution of data packets among each of the plurality of nodes 401. For example, the communications channel 402 may allow for broadcasting of data packets to each of the plurality of nodes 401 relatively simultaneously. Furthermore, the communications channel 402 may be in operative communication with a network (e.g., network 301). Therefore, information may be retrieved or received from the network and broadcast to each of the plurality of nodes 401. Moreover, each of the plurality of nodes 401 may interpret header portions of data packets, store relevant portions of data, process said portions of data, and transmit the results using communications channel 402. In this manner, parallel computation of the data packets may be facilitated.

Therefore, as described above, individual nodes of a computing environment may receive data packets broadcast over a communications channel. Each node of the plurality of nodes may retrieve and store relevant portions of the data packet for computation. Hereinafter, a more detailed description of relevant portions of a data packet is given with reference to FIG. 5.

FIG. 5 illustrates a data packet, according to an exemplary embodiment. As illustrated, the data packet 500 includes a header portion 510 and a data portion 520. The header portion 510 may be substantially similar to header portions 101 and 201, and furthermore, the data portion 520 may be substantially similar to data portions 102 and 202. However, the particular portions and divisions of each of header portion 510 and data portion 520 are given for illustrative purposes only, and should not be construed as limiting.

The header portion 510 may include internet protocol (IP) header portion 501 and distribution header portion 502. According to at least one example embodiment, IP header portion 501 may be omitted entirely, or may be altered to include information related to any communication protocol besides the internet protocol. As such, IP header portion 501 is given for illustrative purposes only. The IP header portion 501 may include communications information related to a communications protocol used for distribution of the data packet 500 (in this example, internet protocol information). Thus, the data packet 500 may be readily transmitted or broadcast among virtually any communications channel.

The distribution header portion 502 may include information related to actual distribution of portions of the data portion 520. More clearly, data header portion 502 may include any of data offsets, instructions, node identification information, and/or any other suitable information. Therefore, if the data header portion 502 is received by a node of a computing environment, said node may interpret the data header portion 502 and decipher relevant portions of the data portion 520 to store and/or perform computations on.

The data portion 520 may include a plurality of information, including a data set. The data portion 520 may be divided into segments, or portions, identified in the data header portion 502. For example, given by way of illustration only and therefore not limiting, data portion 520 may include common data portions (e.g., portion 503), and particular node data portions (e.g., 504). There may be any number of common data portions, or the common data portions may not exist altogether. Furthermore, the particular node portions may be omitted entirely if only common data is being broadcasted. Moreover, the particular node portions may overlap and/or duplicate each other altogether. Data packets as described herein are available to, and may be readily distributed on, a communications channel. However, these data packets may originate on virtually any portion of a communication system, or even a remote computing apparatus. Hereinafter, a packet forming system is described with reference to FIG. 6.

Figure 6:
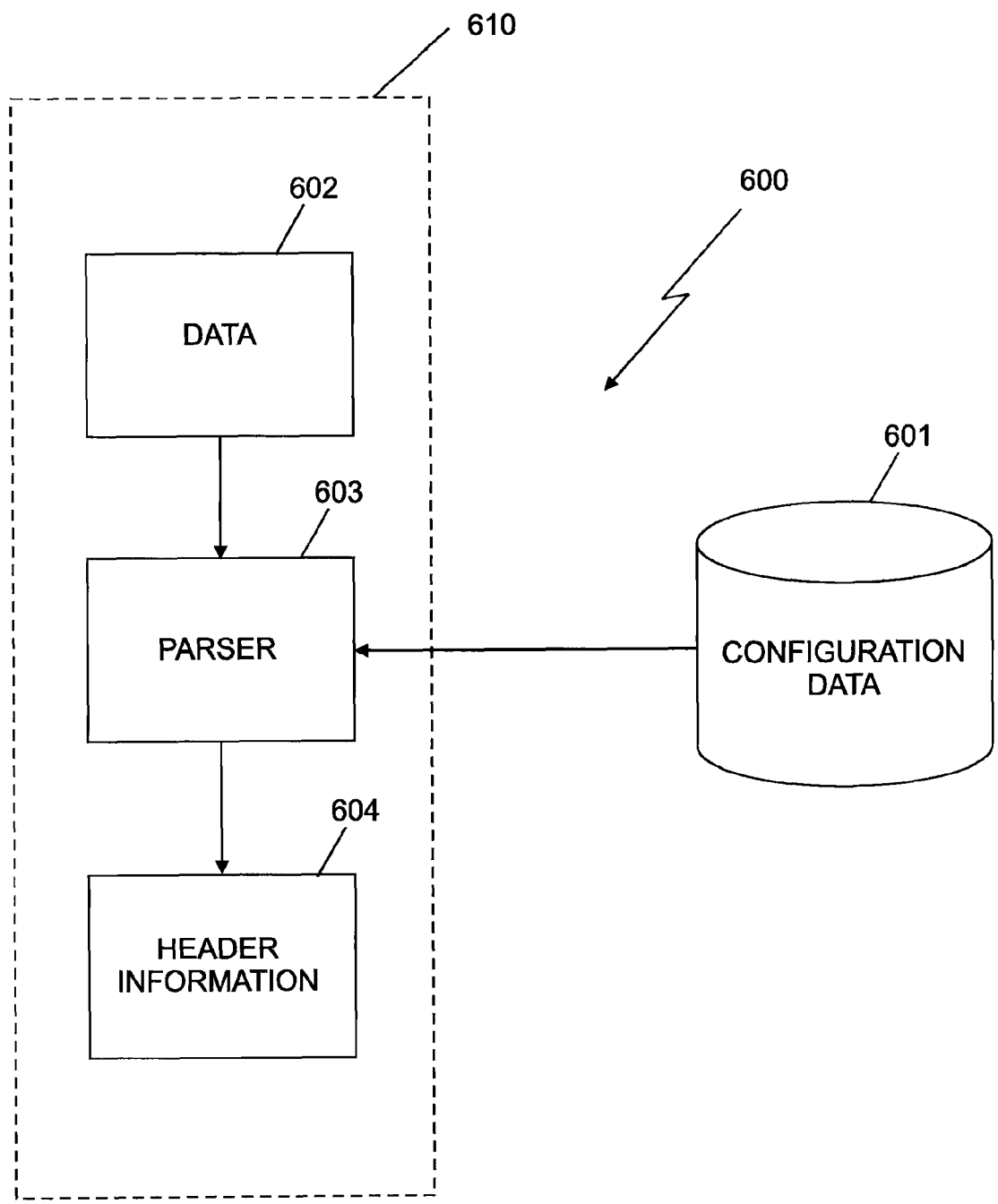
FIG. 6 illustrates a packet forming system, according to an exemplary embodiment.

FIG. 6 illustrates a packet forming system, according to an exemplary embodiment. The packet forming system 600 may be included in a computing environment, or may be completely or partially remote to the computing environment. The packet forming system 600 may include a data storage portion 601. The data storage portion 601 may include configuration data for the computing environment of which data packets are being assembled for. For example, the configuration data may include information related to the number of nodes in the computing environment, the particular configuration of the nodes, node identification means, and/or other suitable information.

The packet forming system 600 may further include data portion 602, parser portion 603, and header information portion 604. For example, the data portion 602 may include one or more data files from which packets are to be created. The data file may be transmitted from the data portion 602 to the parser portion 603. Alternatively, the parser portion 603 may access data portion 602. For example, the parser portion 603 may read the data file from data portion 602. The parser may receive configuration information from the data storage portion 601, and with the configuration data, may parse the data file according to the configuration information.

For example, the parser portion 603 may parse the data file according to the number of appropriate nodes in the computing environment, the configuration of the nodes, and/or other suitable information related to data distribution. Upon parsing the data file, the parser portion 603 may create header information for one or more data packets to be created from the data file. The header information may include information necessary for particular nodes of the computing environment to store and/or perform computations on corresponding portions of the data packet(s) including the header information. The header information may be transmitted to the header information portion 604. Header information portion may store the header information and/or append the header information as a header of at least one data packet. Alternatively, the parser portion 603 may create the header from the header information, and pass the completed header to the header information portion 604.

Furthermore, it is noted that the data portion 602, the parser portion 603, and the header information portion 604 may all exist as a set of computer executable instructions within the computing environment, or on a computer apparatus remote to the computing environment. For example, the data portion 602, the parser portion 603, and the header information portion 604 may exist as an application 610 or other suitable grouping on a storage medium of the computer apparatus. Hereinafter, a methodology of forming packets is described more fully with reference to FIG. 7.

FIG. 7 illustrates a flowchart for a method of forming packets, according to an exemplary embodiment. According to method 700, data may be received at block 701. The data may be a data file or portion thereof. The data may be received by a packet forming system somewhat similar to packet forming system 600.

The method 700 further includes receiving configuration data at block 702. The configuration data may include configuration data for a computing environment, for example, as described above with reference to FIG. 6. Furthermore, the configuration data may be stored in a storage portion of a packet forming system somewhat similar to packet forming system 600.

The method 600 further includes parsing data at block 703. For example, using the received data and configuration data, attributes of the data, or data file, may be interpreted such that an appropriate header portion may be formed. The length (e.g., bitwise length, or other denominator) may be calculated and may be stored as an attribute of portions of the data file for header portion creation. For example, Table 1 below sets forth an example set of code which may be used for data file portion length calculation:

TABLE 1

\\code segment to calculate length of record/data portion
until end_of_record_reached,
do{ read_byte < datafile;
   length_of_record = length_of_record + 1;
} done;

Furthermore, a number of records or portions of the data file may be calculated. The number of portions may be stored as an attribute of the data file for header portion creation. For example, Table 2 below sets forth an example set of code which may be used for this calculation:

TABLE 2

\\code segment to calculate number of records/data portions
num_records = length(datafile) / length_of_record;

Furthermore, a number of target nodes may be determined. For example, depending upon the configuration data for any particular computing environment, there may be any number of available nodes for data processing. Therefore, configuration data may be taken into account for more accurate parsing. The number of target nodes may be stored as an attribute for header information calculations. For example, Table 3 below sets forth an example set of code which may be used for this calculation:

TABLE 3

\\code segment to determine number of target nodes
read num_targets < configuration data;

Furthermore, a number of records/data file portions to be processed by each node may be determined for header portion creation. For example, Table 4 below sets forth an example set of code which may be used for this calculation:

TABLE 4

```
\\code segment to determine number of records/data file portions for nodes
Records_to_send = num_records / num_targets;
```

Upon calculation of any further attributes which may be necessary for header information creation, the header information may be calculated and a header may be created. For example, Table 5 below sets forth an example set of code which may be used in this calculation:

TABLE 5

```
\\code segment to determine header info / create header
offset = 0;
for node in num_targets,
do{ read node_addr < configuration data;
    write node_addr > headerfile;
    \\write start of offset
    write offset > headerfile;
    offset = offset + (records_to_send * length_of_record);
    \\write end of offset
    write offset > headerfile;
}done;
```

With the created header file, the data packet may be broadcast to the nodes of a computing environment, and therefore, the data may be processed accordingly. A method of broadcasting data (i.e., data distribution) is described below with reference to FIGS. 8-9.

FIG. 8 illustrates a flowchart for a method of distributing data, according to an exemplary embodiment. According to FIG. 8, the method 800 includes broadcasting a header of a data packet at block 801. For example, the header portion of a data packet (i.e., header portion 201) may be transmitted separate from the data portion according to some example embodiments. Upon transmittal of the header, or at substantially the same time, a data portion of the data packet may be transmitted at block 802. For example, the data portion of the data packet (i.e., data portion 202) may be transmitted separate from the header portion according to some example embodiments.

Alternatively, the method 800 may include broadcasting the entire data packet (not illustrated). For example, a header portion (i.e., header portion 101) and a data portion (i.e., data portion 102) may be attached and transmitted in succession. However, example embodiments should not be limited to only successive transmission of header and data portions. For example, header portions and data portions may be broadcast simultaneously, in succession, or any combination thereof. However, according to at least one example embodiment, a header portion is transmitted before the data portion.

The method 800 further includes receiving processing results at block 803. For example, after the data packet is broadcasted (e.g., see blocks 801 and 802), node of a computing environment may separate corresponding portions of the data portion of the data packet, process said portions, and return results of said processing over a communications channel.

Turning to FIG. 9, a flowchart of a method of distributing data, according to an exemplary embodiment, is illustrated. The method 900 includes receiving a header broadcast at block 901. For example, the header may be received at a node of a computing environment. The node may decipher the header and interpret portions of a data portion to be stored and/or processed. It follows that the method 900 further includes receiving a data broadcast at block 902. The data broadcast may include information to be processed, for example, a data file or data set. It is noted that as described with reference to FIG. 8, the data packets may be broadcasted in their entirety, in portions (i.e., header broadcast followed by data broadcast), or any suitable broadcast combination. Therefore, the method 900 may include receiving an entire data packet (not illustrated).

For example, nodes of a computing environment receiving the data packet broadcast may interpret the header to decipher information related to the data portion of the data packet. Table 6 provided below sets forth an example set of code which may be used to interpret a header of a data packet:

TABLE 6

```
\\code segment to interpret header
read addr < header;
for addr, start_offset, end_offset,
do { if addr = my addr;
    then { read my_start_offset;
        read my_end_offset; }// end if
} done;
```

Furthermore, nodes of the computing environment may store and/or process corresponding data form the data portion of the data packet. Table 7 provided below sets forth an example set of code which may be used to interpret a header of a data packet:

TABLE 7

```
\\code segment to identify portions of data
offset = 0;
read file < network;
until end_of_file_reached,
do{ read_byte < datafile;
    if (offset >= my_start_offset ) && (offset <= my_end_offset)
        then { write_byte > localdatafile; } //end if
} done;
```

The calculations described above may be performed by an enhancement portion of a network adapter of a node of a computing environment. Upon completion of this processing, or during this processing (e.g., as shown in example Table 7), data may be written or stored in a corresponding node (see block 903). Therefore, each node receiving a broadcasted data packet may decipher the header portion to interpret whether portions of the data within the packet are to be processed by a corresponding node. Upon identification of relevant portions of data within the data packet and/or storage of the relevant portions, the nodes may each process the data (e.g., see block 904). As such, each node with corresponding data from the broadcasted packet may store only data directed to each node in the header portion, and the data may be processed in a relatively parallel manner.

Therefore, as described above, example embodiments provide methodologies and systems for data distribution which may both reduce system resources needed for data distribution, and increase efficiency through a broadcast-type approach to data distribution. The broadcasted information may include a header which directs nodes of a computing environment to store only relevant portions of data from the broadcast. The methodologies described hereinbefore may be extendable to a distributed system environment or any suitable computing environment.

Furthermore, according to an exemplary embodiment, the methodologies described hereinbefore may be implemented by a computer system or apparatus. For example, the computer apparatus may be a node in a computing environment, a remote computer apparatus directing the computing environment to perform said methodologies, or any suitable computer apparatus. However, as an example, FIG. 10 is presented as a simplified computer apparatus capable of executing at least portions of the methodologies described hereinbefore. FIG. 10 illustrates a computer apparatus, according to an exemplary embodiment. Therefore, portions or the entirety of the methodologies herein may be executed as instructions in a processor 1002 of the computer apparatus 1000. The computer apparatus 1000 includes memory 1001 for storage of instructions and information, input device(s) 1003 for computer communication, and display device 1004. Thus, the present invention may be implemented, in software, for example, as any suitable computer program on a computer system somewhat system to computer apparatus 1000 or computing environment 1000. For example, a program in accordance with the present invention may be a computer program product causing a computer processor to execute the example methodologies described herein.

The computer program product may include a computer-readable medium having computer program logic or code portions embodied thereon for enabling a processor (e.g., 1002) of a computer apparatus (e.g., 1000) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With exemplary embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A method for improved distribution of data in a computing environment, comprising:
   receiving data for distribution in the computing environment;
   receiving configuration data of the computing environment;
   parsing the data for distribution using the configuration data into header information of a packet, wherein the header information includes
      one or more data offsets identifying a common data portion within the data for distribution, the common data portion being available to all nodes of the computing environment and identifying a first node of the computing environment and a particular-node data portion within the data for distribution, the particular-node data portion being available only to the first node of the computing environment;
   broadcasting the header information of the packet to all nodes of the computing environment;
   broadcasting the data for distribution to all nodes of the computing environment in response to broadcasting the header information; and
   wherein parsing the data for distribution includes:
      interpreting the configuration data for the number of nodes in the computing system;
      computing a size of the received data; and
      forming the header information for the packet including a number of target nodes based on the number of nodes in the computing system and size of the received data, the header information including a plurality of particular-node data offsets, each particular-node data offset identifying a plurality of particular-node data portions and each particular-node data offset being associated with a different node of the computing environment.

2. The method of claim 1, wherein receiving the data for distribution includes receiving a data file for distribution among nodes of the computing environment.

3. The method of claim 1, wherein the configuration data includes information related to the distribution of nodes in the computing environment.

4. The method of claim 1, further comprising:
   receiving processing results of the header information and the data for distribution from individual nodes of the computing environment.

5. A method for improved distribution of data in a computing environment, comprising:
   receiving, at a node of the computing environment, a header information broadcast;
   receiving, at the node of the computing environment, a data broadcast, wherein the header information broadcast includes one or more data offsets identifying a common data portion within the data broadcast, the common data portion being available to all nodes of the computing environment, and identifying the node and a particular-node data portion within the data broadcast, the particular-node data portion being available only to the node;
   storing the common data portion and the particular-node data portion of the data broadcast; and
   processing the stored portions of data at the node of the computing environment;
   wherein storing portions of the data broadcast includes:
      interpreting the header information to retrieve the first and second data offsets;
      mapping the first and second data offsets on the broadcast data; and
      storing only portions of the broadcast data corresponding to the mapping of the first and second data offsets.

6. The method of claim 5, further comprising:
   returning the processing results.

7. The method of claim 5, wherein the header information broadcast includes mapping information for appropriate portions of the data for distribution to be processed by the node of the computing environment.

8. The method of claim 5, wherein receiving the data broadcast includes receiving a data portion of a data packet broadcast to all nodes of the computing environment.

9. A computer program product including a non-transitory computer readable storage medium with program segments for, when executed on a computer device, causing the computer device to implement a method of improved distribution of data, the method comprising:

receiving data for distribution in the computing environment;

receiving configuration data of the computing environment;

parsing the data for distribution using the configuration data into header information of a packet, wherein the header information includes, one or more data offsets identifying a common data portion within the data for distribution, the common data portion being available to all nodes of the computing environment, and identifying a first node of the computing environment and a particular-node data portion within the data for distribution, the particular-node data portion being available only to the first node of the computing environment;

broadcasting the header information of the packet to all nodes of the computing environment;

broadcasting the data for distribution to all nodes of the computing environment in response to broadcasting the header information;

receiving processing results of the header information and the data for distribution from individual nodes of the computing environment;

receiving, at the first node of the computing environment, the header information broadcast;

receiving, at the first node of the computing environment, the data broadcast;

storing the common data portion and the particular-node data portion of the data broadcast at the first node; and processing the stored portions of data at the first node of the computing environment.

\* \* \* \* \*